(12) United States Patent
O'Rouke

(10) Patent No.: US 6,317,935 B1
(45) Date of Patent: Nov. 20, 2001

(54) LIFE LINE TERMINATION

(75) Inventor: Michael J. O'Rouke, Edmonton (CA)

(73) Assignee: Rose Manufacturing Company, Englewood, CO (US)

( * ) Notice: Subject to any disclaimer, the term of this patent is extended or adjusted under 35 U.S.C. 154(b) by 0 days.

(21) Appl. No.: 09/387,731

(22) Filed: Sep. 1, 1999

Related U.S. Application Data

(63) Continuation-in-part of application No. 09/087,866, filed on Jun. 1, 1998, now abandoned.

(51) Int. Cl.⁷ ..................................................... F16G 11/00
(52) U.S. Cl. ................... 24/129 R; 24/129 B; 24/115 K
(58) Field of Search ................................. 24/129 R, 130, 24/129 B, 115 H, 129 A, 128, 129 D, 115 K

(56) References Cited

U.S. PATENT DOCUMENTS

| | | | |
|---|---|---|---|
| 59,277 | * | 10/1866 | Sawyer . |
| 71,393 | | 11/1867 | Kuntz . |
| 122,135 | * | 12/1871 | Setchell et al. . |
| 356,116 | | 1/1887 | Garfield . |
| 363,352 | | 5/1887 | Avery . |
| 381,864 | * | 4/1888 | Travers . |
| 413,135 | | 10/1889 | Dennis . |
| 434,888 | | 8/1890 | Ross . |
| 437,470 | * | 9/1890 | Wright . |
| 518,880 | | 4/1894 | Evans . |
| 601,805 | | 4/1898 | Cook . |
| 649,458 | | 5/1900 | Ives . |
| 678,533 | | 7/1901 | Bancker . |
| 756,641 | | 4/1904 | Irving . |
| 872,355 | | 12/1907 | LeMaire . |
| 904,483 | | 11/1908 | Cooper . |
| 912,387 | | 2/1909 | Landry . |
| 1,114,392 | | 10/1914 | Shuart . |
| 1,153,053 | | 9/1915 | Forster . |
| 1,230,169 | | 6/1917 | Johnson . |
| 1,383,665 | | 7/1921 | Rohan . |
| 1,407,406 | * | 2/1922 | Glazebrook . |
| 1,713,901 | | 5/1929 | Hanson . |
| 2,151,664 | | 3/1939 | Redfield . |
| 2,193,236 | | 3/1940 | Meighan . |
| 2,316,950 | * | 4/1943 | Goeller . |
| 2,345,890 | | 4/1944 | Daniels et al. . |
| 2,424,658 | | 7/1947 | Hanson . |
| 2,466,083 | | 4/1949 | Crosby . |
| 2,506,276 | | 5/1950 | Maxwell . |
| 2,538,021 | | 1/1951 | Lushbaugh . |
| 2,561,371 | | 7/1951 | Hill . |
| 2,601,083 | | 6/1952 | Brouse . |
| 2,903,772 | | 9/1959 | McKinlay . |
| 2,932,072 | * | 4/1960 | Pruchnow . |
| 3,768,711 | * | 10/1973 | Wilkinson . |
| 3,911,610 | * | 10/1975 | Goodman . |
| 3,997,945 | | 12/1976 | Robins . |
| 4,213,611 | * | 7/1980 | Hicks . |
| 4,733,862 | * | 3/1988 | Miller . |
| 5,116,059 | * | 5/1992 | Pelletier . |
| 5,625,925 | | 5/1997 | Richards . |

FOREIGN PATENT DOCUMENTS 118902 6/1909 (CA) .

* cited by examiner

Primary Examiner—James R. Brittain

(57) ABSTRACT

A device to be secured to the end of a rope to provide a formed eye to which a carabiner or the like may be attached. The device comprises an elongated planar bar having a plurality of spaced, rope-receiving apertures along its length, the apertures each having a diameter which is similar to that of the rope and being spaced, so that the rope may be flushly received in the apertures and threaded through them in sequence. The apertures have beveled edges so as not to cut the rope when threaded therethrough. A further aperture is provided in the bar to constitute the formed eye through which the carabiner or the like may be releasably attached. When an end of the rope is threaded through the rope receiving openings and passed through a last loop formed thereby and tightened, the friction rope develops with it secures the device in place at the rope end.

1 Claim, 5 Drawing Sheets

LIFE LINE TERMINATION

RELATED APPLICATIONS

The present application is a continuation-in-part of U.S. Ser. No. 09/087,866 filed Jun. 1, 1998 now abandoned.

FIELD OF THE INVENTION

This invention relates to a life line termination, and more particularly to a device to be secured to the end of a rope to provide a formed eye to which a carabiner or the like may be attached.

BACKGROUND OF THE INVENTION

Life line and rope end terminations, providing a loop through which a carabiner or the like may be attached, are often used in fall arrest and rescue systems for workers and other such persons. Conventionally the rope end comprises one of (a) a knot termination, (b) a splice termination where the rope braids have been spliced at the end of the rope to form a loop, (c) a stitched eye where the rope is in the form of a strap and an end has been folded back onto the strap and stitched to form an eye, or (d) formed from a swaged fitting, where the rope is folded back on itself and the rope end held securely together with a portion of the rope, forming an eye, by means of swaged fittings. Each of these constructions, when properly implemented, facilitate a secure connection to an anchor.

These constructions of rope ends require, in most instances, a previously constructed rope end (e.g. spliced termination, stitched eye) or, in the case of a swaged fitting, multiple component fittings for the endings including a thimble about which the rope is wrapped and multiple pieces of each swaged fitting which must be assembled about the portions of the rope end and secured together to frictionally engage those portions. In many circumstances, particularly where time is of the essence, it is not possible or practical to find a rope with the appropriate end.

Various proposals have been made for alternate termination arrangements.

Of background interest are Cooper, U.S. Pat. No. 904,483 issued Nov. 24, 1908 and Forster, U.S. Pat. No. 1,153,053 issued Sept. 7, 1915 which teach specifically formed metal plates having a plurality of rope receiving apertures of a size significantly larger than the rope to allow freedom of movement of the rope for tightening of the rope end, in the case of Cooper, or securing of a fishing line to the device (in the case of Forster). Kuntz U.S. Pat. No. 71,393 issued Nov. 26, 1867 teaches a device somewhat similar to that of the Cooper patent.

Cook, U.S. Pat. No. 601,805 issued Apr. 5, 1898 and U.S. Pat. No. 3,997,945 of Robins again both teach plate-like devices having rope receiving apertures, through which ropes are intended to slide for purposes of tightening or tensioning systems of which the ropes and devices are parts.

Hanson, U.S. Pat. No. 1,713,901, issued May 21, 1929 teaches a rope end termination for a hay sling, the termination having a plurality of spaced holes too small to receive the rope itself, but large enough to receive portions of the rope so that the rope may be spliced or braided thereto.

Of interest in that they teach fasteners for two ends of a rope, through which a rope may be pulled for tightening purposes, as in the case of a conventional clothes line are Redfield, U.S. Pat. No. 2,151,664 issued Mar. 21, 1939; Richards U.S. Pat. No. 5,625,925, issued May 6, 1997; Le Maire, U.S. Pat. No. 872,355 issued Dec. 3, 1907; Maxwell, U.S. Pat. No. 2,506,274 issued May 2, 1950; Bancker, U.S. Pat. No. 678,533, issued Jul. 16, 1901; Landry, U.S. Pat. No. 912,387 issued Feb. 16, 1909 (and its Canadian counterpart, Canadian Patent No. 118902, issued June 1909) and Rohan, U.S. Pat. No. 1,383,665 issued Jul. 5, 1921.

Prior patents describing and illustrating devices through which threaded ropes may be moved in controlled fashion, for instance to lower a person from one level to another as a means of a fire escape, include Shuart, U.S. Pat. No. 1,114,392 issued Oct. 20, 1914; Ross, U.S. Pat. No. 434,888, issued Aug. 19, 1890; Ives, U.S. Pat. No. 649,458 issued May 15, 1900; Irving, U.S. Pat. No. 756,641 issued Apr. 5, 1904; Johnson, U.S. Pat. No. 1,230,169 issued Jun. 19, 1917 and Crosby, U.S. Pat. No. 2,466,083 issued Apr. 5, 1949.

Also of background interest are Daniels et al, U.S. Pat. No. 2,345,890 issued Apr. 4, 1944 and Brouse, U.S. Pat. No. 2,601,083 issued Jun. 17, 1952, which teach drop wire ties for electrical conductor wires such as telephone lighting and other wires, in that they provide a series of slots through which the wires are threaded.

U.S. Pat. No. 413,135 of Dennis issued Oct. 15, 1889, teaches a simple snap clip device having a pair of rope receiving holes at one end, and spurs to pierce the rope where it is looped through the holes to immobilize it and secure it to the snap. Finally of general background interest teaching other types of rope receiving blocks and fittings for gripping ropes are Evans, U.S. Pat. No. 518,880 issued Apr. 24, 1894; McKinlay, U.S. Pat. No. 2,903,772 issued Sep. 15, 1959; Hill, U.S. Pat. No. 2,561,371 issued Jul. 24, 1951; Meighan, U.S. Pat. No. 2,193,236 issued Mar. 12, 1940 and Pruchnow, U.S. Pat. No. 932,072 issued Apr. 12, 1960.

It is an object of the present invention to provide a life line termination which is simple in construction and may be easily and securely fitted to a life line or rope end, on site, to provide a formed eye to the end of the rope, to which a carabiner or the line may be attached.

Throughout the rest of this specification, "rope" will be used synonymously with "life line".

SUMMARY OF THE INVENTION

In accordance with the present invention there is provided a device to be secured to the end of a rope to provide a formed eye to which a carabiner or the like may be attached. The device comprises an elongate planar bar having a plurality of spaced, rope-receiving apertures along its length, the apertures each having a diameter which is similar to that of the rope and being spaced, so that the rope may be flushly received in the apertures and threaded through them in sequence. The apertures have beveled edges so as not to cut the rope when threaded therethrough. A further aperture is provided in the bar to constitute the formed eye through which the carabiner or the like may be releasably attached. When an end of the rope is threaded through the rope receiving openings and passed through a last loop formed thereby and tightened, the friction the rope develops with the metal bar secures the device in place at the rope end.

It is preferred that the carabiner - receiving aperture be located towards one end of the bar.

Such a rope end termination device is extremely simple to manufacture, comprising, as it does, a planar bar with some spaced apertures formed in it. Thus, only a single part is required.

Its attachment to a rope end is extremely easy to achieve, requiring merely the threading of an end of the rope through adjacent holes, the passage of the rope end through the last loop in the thread, and then the tightening thereof to provide an extremely safe and secure rope end attachment for subsequent use.

BRIEF DESCRIPTION OF THE DRAWINGS

The following is a description by way of example of a preferred embodiment of the present invention, reference being made to the accompanying drawings in which.

While the invention will be described in conjunction with the illustrated embodiment, it will be understood that it is not intended to limit the invention to such embodiment. On the contrary, it is intended to cover all alternatives, modifications, and equivalents as may be included within the spirit and scope of the invention as defined by the appended claims.

DETAILED DESCRIPTION OF THE PREFERRED EMBODIMENTS

Figure 1:
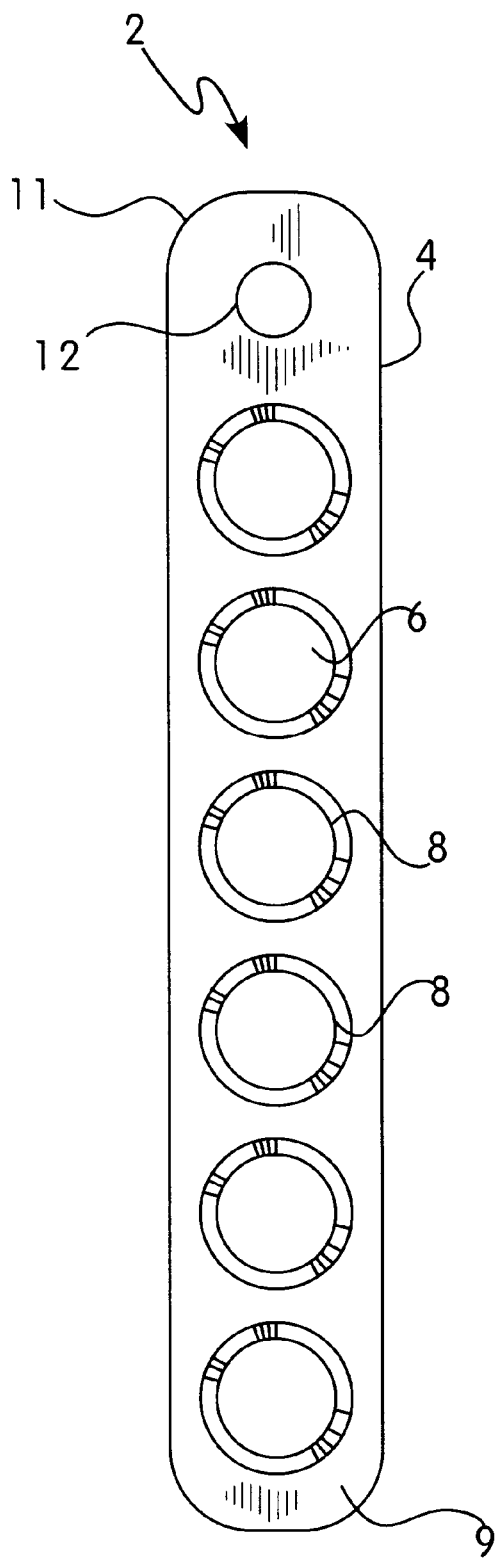
FIG. 1 is a plan view, from the front of a rope end termination.
Figure 2:
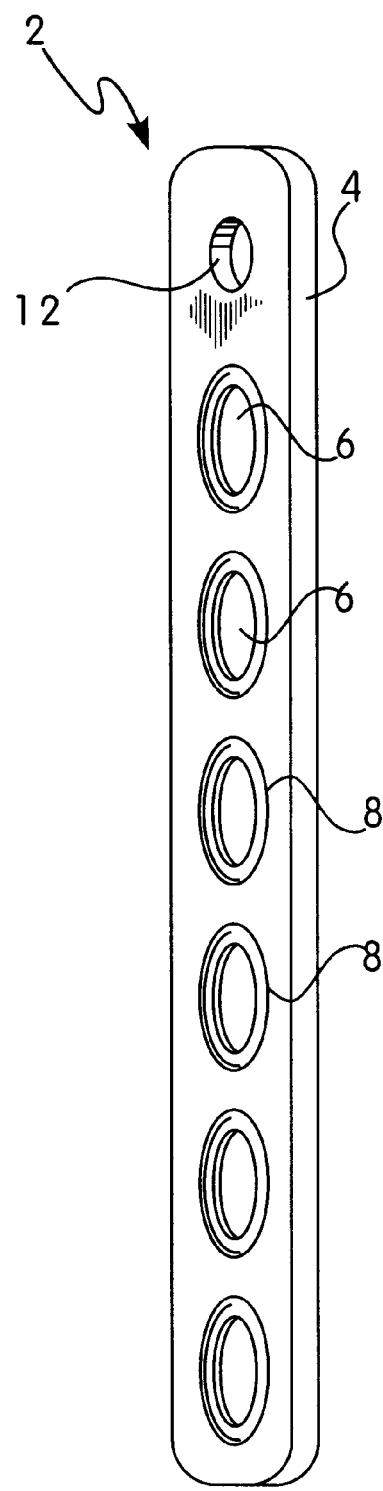
FIG. 2 is a perspective view of a rope and termination.
Figure 3:
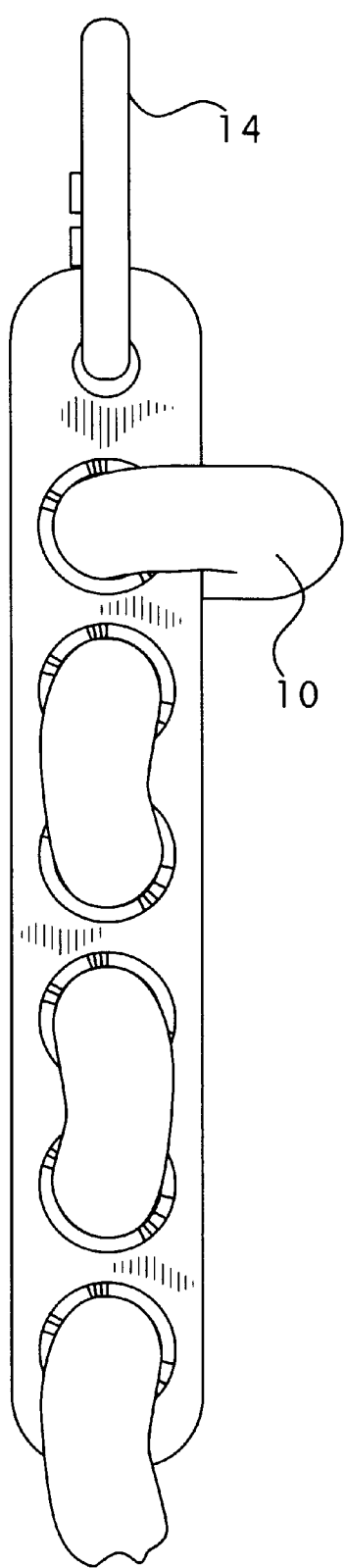
FIG. 3 is a plan view, from the front, of the device of FIG. 1 with a rope end carabiner in position.
Figure 4:
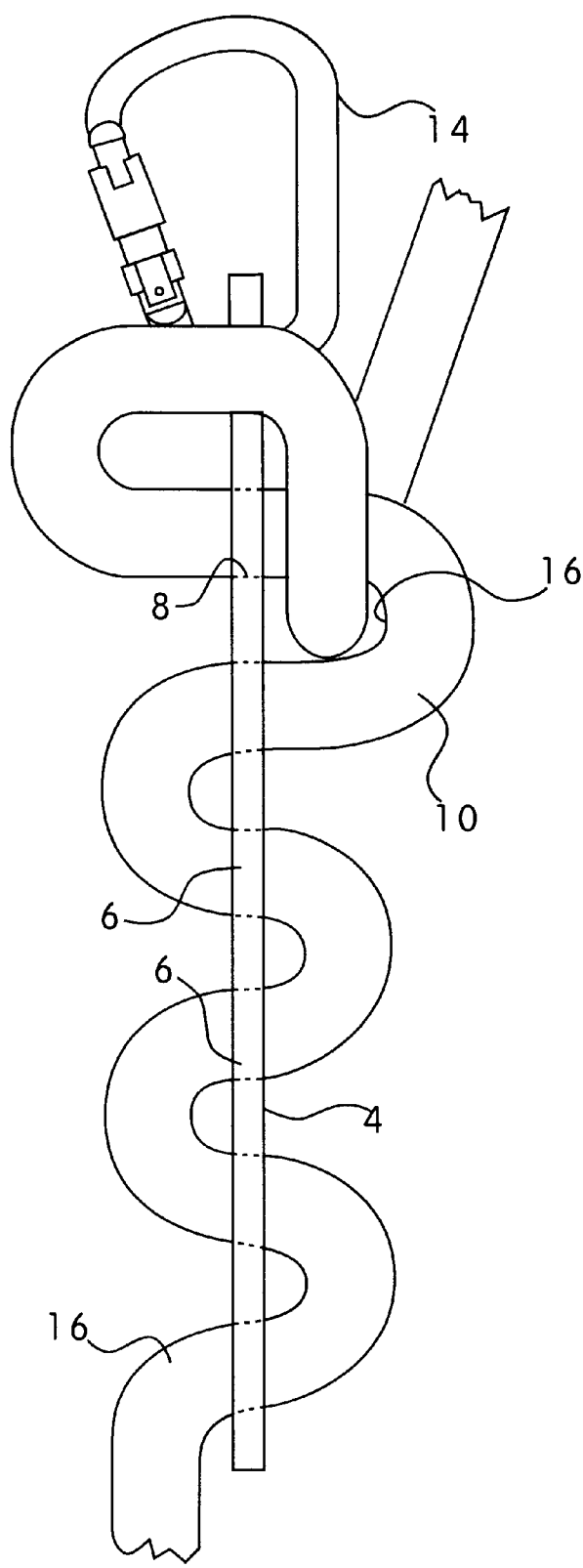
FIG. 4 is a plan view from the side of the termination of FIG. 1 and 2, with the rope and carabiner in position.

As can be seen in FIG. 1, the termination device 2 comprises an elongated, planar bar 4 of generally rectangular configuration, with rounded corners. Bar 4 may be of any appropriate metal (aluminum, steel or stainless steel), or other materials such as sturdy plastic. A plurality of rope receiving apertures 6 are spaced along a major portion of the bar, from one end 9 towards the other 11. The apertures 6 are of similar size and have smooth edges 8 either rounded or beveled, to facilitate the threading of a rope 10 and minimize the risk of cutting or tearing of the rope as it is passed through aperture 6 or is seated therein. As can be seen in FIGS. 3 and 4, diameter of each of aperture 6 is approximately similar to that of rope 10 so that rope 10 can be threaded through the apertures 6 as illustrated in FIGS. 3 and 4, but will be frictionally held therein against some purposeful disengagement when in final position and a load is applied.

A further aperture 12, at the other end 11 of bar 4 is provided and in the embodiment of FIG. 1 is of different diameter to the apertures 6. The aperture 12 is provided to receive a carabiner 14 or the like to secure the bar 4 to an anchor.

In order to secure bar 4 to rope 10, as can be seen in FIGS. 3 and 4, one end of rope 10 is threaded, as illustrated, through consecutive apertures 6. When the rope 10 has passed through the last of these apertures 6, it is then passed back on itself under the last loop 16 and tightened so that the rope 10 is then locked in place. The friction the rope 10 develops by passing through the aperture 6 in the bar 4 provides the frictional grip required to secure the device 2 in place at the end of the rope 10. If desired, a diagram (not shown) may be engraved or otherwise placed on the metal bar 4 to show a user the precise manner of threading the rope 10 through the bar 4 and securing it thereon.

With the rope 10 secured, the aperture 12 is available at the one end 11 of the bar to provide an eye for securing the lifeline 10 to an anchor.

The device 2 provides a simple, efficient system that permits a qualified person to attach a formed eye 12 to a specified lifeline 10 rapidly without the need of any tools. The device 2 may be used with suitable ropes 10 including conventional 3-strand laid rope, solid braid or static kernmantle lifeline. The termination in tests has provided at least 90% of the breaking strength of the rope.

With the device 2 secured to the rope 10 and eye 12 is provided that may be used in a number of different ways.

In a first arrangement shown in FIGS. 3 and 4, a carabiner 14 is passed through the aperture 12 and allows a stable attachment to a suitable anchor or harness. In this embodiment, the smaller diameter of the aperture 12 ensures that the rope 10 cannot be threaded through the aperture 12 accidentally.

Figure 5:
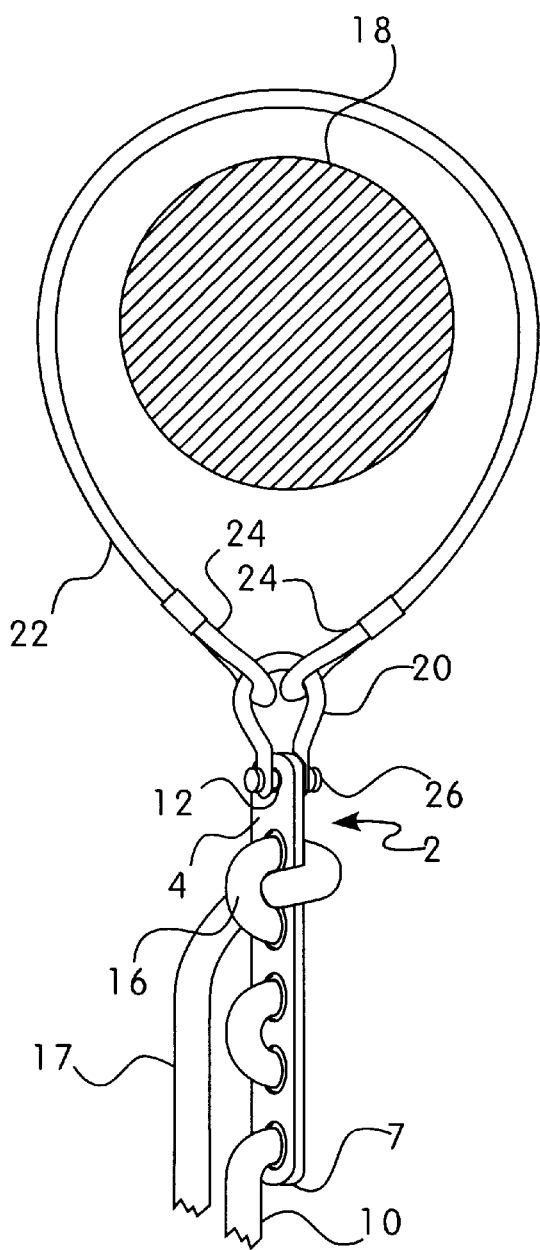
FIG. 5 is a schematic illustration of a restraint system incorporating the device of FIG. 1 and 2.
Figure 6:
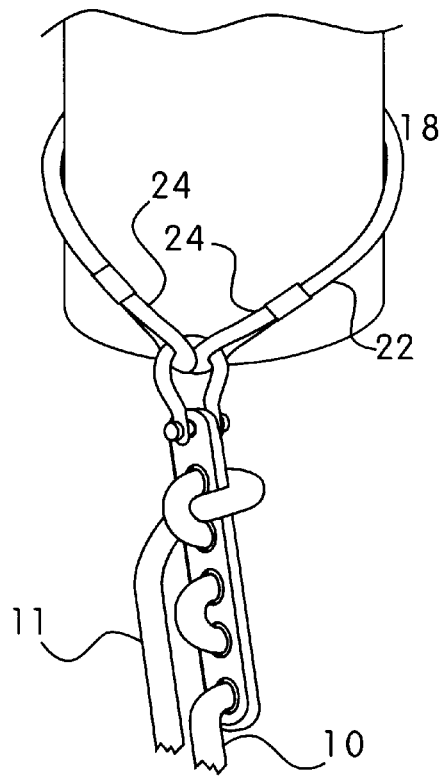
FIG. 6 is a plan view of the system shown in FIG. 5.

As seen in FIGS. 5 and 6, the device 2 may also be used with a flemish eye cable sling 22 that passes around an anchor 18. The sling 22 terminates in a pair of formed loops 24. A shackle 20 is passed through each of the loops 24 and secured to the bar 4 by a bolt 26 that passes through the aperture 12. Again a secure attachment of the line 10 to the anchor 18 through the formed eye 12 on the bar 4 is provided.

Figures 7, 8:
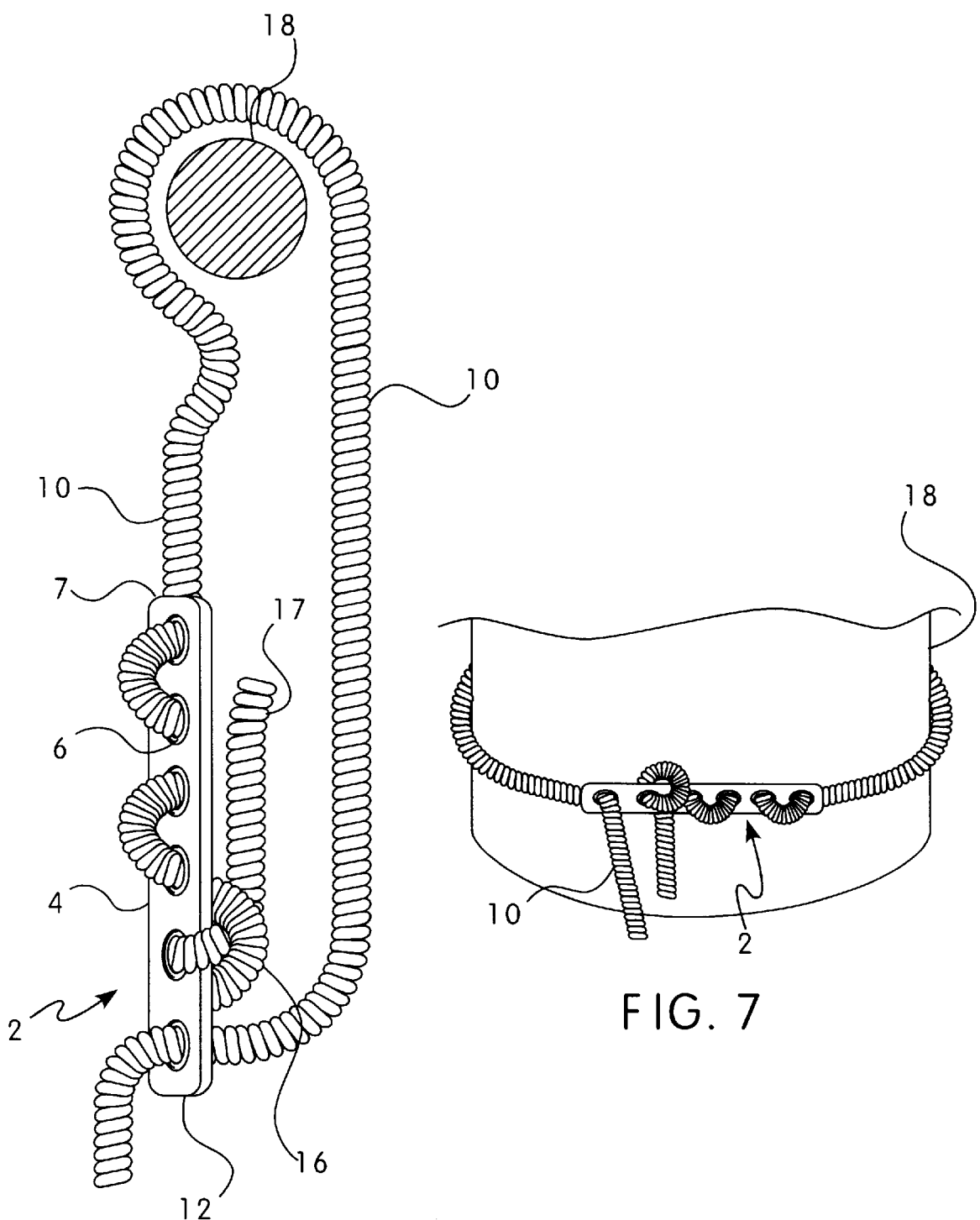
FIG. 7 is a schematic view, similar to FIG. 5 of a further restraint system for securing a rope to an anchor.
FIG. 8 is a plan view of FIG. 7.

In each of the embodiments of FIGS. 3 and 5, a supplementary fastening device 14, 20 is used to attach the bar 4 to the anchor 18. In certain circumstances this may not be convenient and as shown in FIG. 7 the device 2 has sufficient versatility to allow a secure loop to be formed without any supplementary fastening. In the embodiment shown in FIG. 7 the aperture 12 is of the same or slightly greater diameter than the aperture 6. The device 4 is secured to the rope 10 as shown in FIG. 3 to provide the free aperture 12. The rope 10 may then be passed around the anchor 18 and threaded through the aperture 12 to form a running loop around the anchor 18. The rope 10 is free to run through the aperture 12, provided the bar 4 is maintained generally transverse to the rope 10. However once again the connection of the bar 4 to the rope 10 is achieved in a simple effective manner to provide the versatility of the formed eye 12 on the end of the rope 10.

Figure 9:
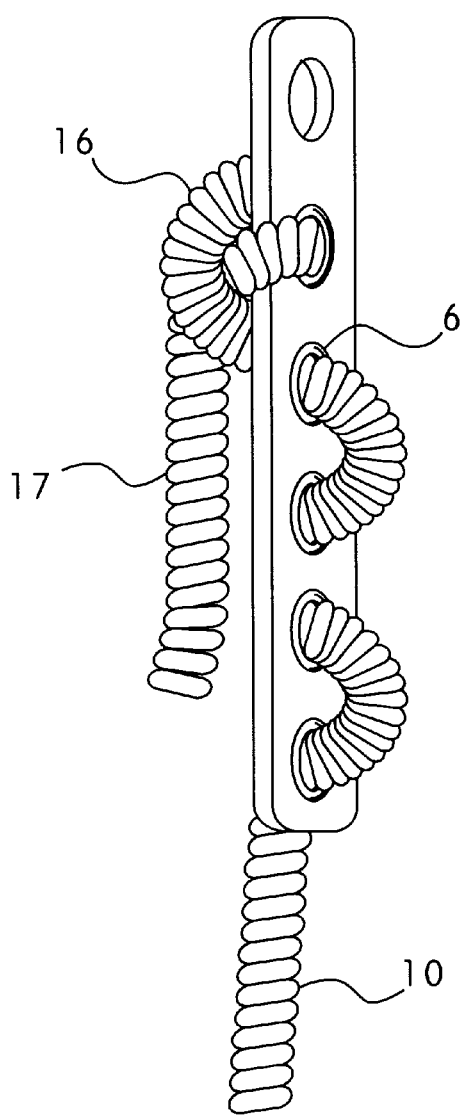
FIG. 9 is an enlarged view similar to FIG. 3 of the device of FIG. 1 with a rope attached and FIG. 10 is a view of the device of FIG. 9 with a sleeve fitted.
Figure 10:
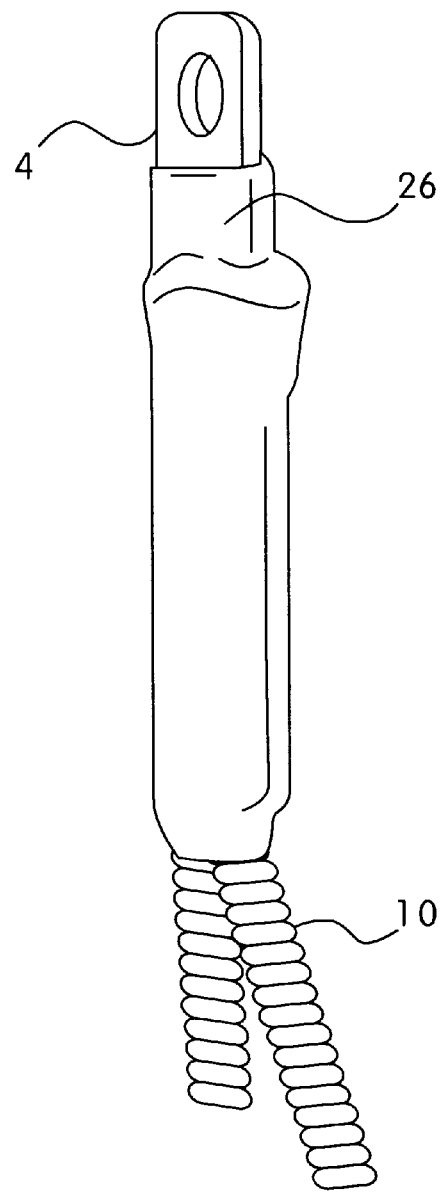

As shown in FIGS. 9 and 10, the device 2 may also be used to form a permanent loop on the end of a rope 10 where preferred. In this case, the rope 10 is secured to the bar 4 by threading through the aperture 6. The aperture 12 is of course left open. The tail of the rope indicated at 17 is positioned alongside the rope 10 and has a length so that it is coextensive with the rope 10 for at least 12 inches. A sleeve 26 is then positioned over the bar 4 and tail 17 of the rope 10 leaving the aperture 12 clear. The sleeve 26 is made from a heat shrinkable plastic, preferably from a higher visible colour, and is shrunk fit over the bar 4 to cover the knot and threaded portions of the rope 10. A permanent connection is thus made to the bar 4 and any damage or attempt to tamper with the attachment will be evident from a visual inspection of the sleeve 26.

While in the drawings six rope receiving apertures 6 are illustrated, it has been determined that, for some applications, as few as four apertures 6 may be adequate.

Alternatively more than six apertures 6 may be provided. For most applications, however, more than six or seven apertures 6 become redundant.

The device 2 may be used for differing sized ropes 10, by appropriate modification of the diameter of aperture 6. For example, it is suitable for ⅝ inch/16 mm diameter, ⅜ inch/9 mm diameter, and ½ inch/12 mm diameter ropes 10. A clearance of ⅛" to ¼" is typically sufficient to provide free insertion of the rope with effective frictional engagement.

It will be understood that, in addition to the termination device 2 being a one-piece design (so that no parts can be lost) and being installable within seconds without the need of any tools, it is adjustable along the length of a specified lifeline 10.

I claim:

1. A restraint system comprising a rope and an end device secured to the rope to provide a formed eye, the end device comprising a bar having a plurality of aperatures spaced apart along its length, the rope being threaded through at least four consecutive adjacent aperatures and passed back through a loop formed by the rope between adjacent aperatures such that one of the aperatures is free and the rope frictionally engages the bar to inhibit separation of the rope and the bar upon application of a load, and wherein a heat shrinkable sleeve overlies and grips the rope and the bar adjacent to one of the aperatures.

\* \* \* \* \*